United States Patent
Pizzato et al.

(10) Patent No.: US 12,046,096 B2
(45) Date of Patent: Jul. 23, 2024

(54) SAFETY SWITCH WITH PUSH-BUTTON PANEL

(71) Applicant: PIZZATO ELETTRICA S.R.L., Marostica (IT)

(72) Inventors: Marco Pizzato, Marostica (IT); Simone Zonta, Bassano del Grappa (IT)

(73) Assignee: PIZZATO ELETTRICA S.R.L., Marostica (IT)

( * ) Notice: Subject to any disclaimer, the term of this patent is extended or adjusted under 35 U.S.C. 154(b) by 46 days.

(21) Appl. No.: 17/624,861

(22) PCT Filed: Jun. 30, 2020

(86) PCT No.: PCT/IB2020/056188
§ 371 (c)(1),
(2) Date: Jan. 5, 2022

(87) PCT Pub. No.: WO2021/009601
PCT Pub. Date: Jan. 21, 2021

(65) Prior Publication Data
US 2022/0262186 A1    Aug. 18, 2022

(30) Foreign Application Priority Data
Jul. 12, 2019 (IT) .................. 102019000011697

(51) Int. Cl.
| | |
|---|---|
| *G07C 9/29* | (2020.01) |
| *F16P 3/08* | (2006.01) |
| *H01H 3/02* | (2006.01) |
| *H01H 13/14* | (2006.01) |

(52) U.S. Cl.
CPC ................. *G07C 9/29* (2020.01); *F16P 3/08* (2013.01); *H01H 3/022* (2013.01); *H01H 13/14* (2013.01)

(58) Field of Classification Search
CPC .. G07C 9/29; F16P 3/08; H01H 3/022; H01H 13/14; H01H 13/86; H01H 13/04; H01H 3/02; H01H 3/161; H01H 2233/03; H01H 9/226; H01H 27/06; H01H 27/002; H01H 27/007; H01H 50/32; H01H 2223/024; H01H 2223/028; H01H 50/02; H01H 9/0207; H01H 19/62; H01H 2003/0246;
(Continued)

(56) References Cited

U.S. PATENT DOCUMENTS

| | | | | |
|---|---|---|---|---|
| 9,819,342 | B2 * | 11/2017 | Pizzato | ............... H03K 17/965 |
| 10,643,807 | B2 * | 5/2020 | Pizzato | ............... H01H 9/0207 |
| 2022/0251876 | A1 * | 8/2022 | Pizzato | ................... E05B 39/00 |

* cited by examiner

*Primary Examiner* — Lheiren Mae A Caroc
(74) *Attorney, Agent, or Firm* — Rivka Friedman

(57) ABSTRACT

A switch monitors an access (A) to a machine or plant. The switch has a switching device (3) housing switching mechanism, an actuator device (2), and a push-button panel (12). The housing switching mechanism operatively connects to one or more circuits of the machine or plant. The actuator device (2) interacts with the switching mechanism at the opening/closing of the access (A). The push-button panel (12) has a shell (14) provided with controls (13) designed to operate on one or more of the circuits of the machine or plant. The shell anchors to a fixed part (F) of the access (A) to allow the rotation of the shell (14) around a rotation axis (R), so as to vary an orientation of the shell (14) with respect to the switching device (3) and/or to control and/or service circuits.

15 Claims, 11 Drawing Sheets

(58) Field of Classification Search
CPC ...... H01H 2300/026; H01H 3/14; H01H 9/04; H01H 9/28
See application file for complete search history.

SAFETY SWITCH WITH PUSH-BUTTON PANEL

TECHNICAL FIELD

The present invention finds application in the sector of electrical devices for industrial use and particularly relates to a safety switch equipped with a separate or integrated pushbutton panel which can be separated if necessary to be applied to barriers or protection panels for the control of access to machines or industrial plants.

STATE OF THE ART

As is known, access to machines or industrial plants requires constant surveillance through the provision of means that prevent voluntary or accidental entry within the operating perimeter by operators.

For this purpose, the accesses such as barriers, perimeters and protection panels are generally provided with one or more safety devices connected to the power circuit of the machine or system, as well as possibly to auxiliary service circuits.

In this way, access within the perimeter is allowed only after the block of the machine or system or of dangerous parts.

Appropriate circuits constantly report both the operating status of the machine or system and any anomalies that may affect any part of the system.

Generally, the safety switches comprise a switching device intended to be anchored to the fixed part of the barrier and which houses the various circuits suitable for being connected to the power supply and/or service circuits of the machine or plant in order to determine its opening/closing or locking or to send signals, depending on commands from outside.

On the mobile part there is instead an actuator device which has the task of interacting with the switching device in order to generate the various signals indicating the closed and/or blocked access status, also preventing the opening of the access if they are not verified. the predefined safety conditions for the specific machine or system.

The interaction between the switching device and the actuator device can be achieved by mechanical or electromechanical means or by electronic and possibly contactless means.

In the first case, the actuator device is provided with an actuator, for example of the key type, which is inserted inside a special slot of the switching device to interact with a locking/unlocking mechanism housed inside the device. switching.

This mechanism is designed to prevent the release of the actuator and the consequent possibility of opening the access in unsafe conditions or by unauthorized persons.

In the case of electronically operated switches, the interaction between the two devices occurs following the sending of a presence signal by the actuator device to the switching device.

In some cases, the actuator device also comprises a retaining and/or centering element which interacts with a locking/unlocking mechanism present in the switching device.

An example of this switch is described, for example, in WO2017/208124, in the name of the same Applicant, wherein the switching device is associated with an emergency auxiliary module provided with a mushroom-head button whose fiction is that of mechanical auxiliary release and which is configured to act directly on the pin that blocks the retaining and centering element so as to free it.

The functionality of the switching device can be implemented by applying one or more additional pushbuttons or electromechanical control devices that allow to act on the lock-unlock mechanism or on the auxiliary circuits, for example in order to send one or more service signs.

Generally, the controls, which can be buttons, key selectors or other types of actuator devices, are collected in a push-button panel which can be applied to the housing of the switching device directly or indirectly.

For example, in the first case, the switching device may comprise a control support plate to be applied directly to the housing in place of the normal cover, after wiring the controls.

This solution has some drawbacks, one of which is represented by the high complexity of wiring the controls with the control unit located inside the casing to establish the connection with the circuits to be controlled.

These solutions also have relatively limited flexibility and in particular do not allow the controls to be positioned in the most comfortable position according to the anchoring mode of the switching device or the access opening/closing mode.

A variant of this solution provides that the push-button panel is equipped with a terminal block that connects to a terminal block inside the housing to simplify the connection, but without exceeding the limits in the flexibility of positioning.

Solutions with a push-button panel external to the device always require direct wiring of the cables coming out of the push-button panel, with the consequent presence of wires at the entrance and exit of the push-button panel, which constitute a footprint and an obstacle to the correct assembly of the push-button panel and switch.

Furthermore, the need to connect the individual controls to the internal circuits of the device makes the assembly operation laborious and complex, with a consequent increase in general costs.

A further common limit to the solutions described above is also the reduced number of commands that can be associated with the same switch, in particular due to the limited space available, as well as the limited possibility of customizing the device.

SCOPE OF THE INVENTION

The object of the present invention is to overcome the above-mentioned drawbacks by providing a safety switch with push-button panel applicable to accesses for the control of industrial machines or plants which is characterized by high efficiency and relative economy.

A particular object is to provide a safety switch which can be associated with a push-button panel relatively quickly and easily.

Still another object is to provide a safety switch with push-button panel wherein the position of the push-button panel with respect to the switch can be changed quickly and with high flexibility, according to the needs of the user.

Still another object is to provide a safety switch with push-button panel which provides for the possibility of customizing the commands associated therewith.

Still another object is to provide a safety switch with push-button panel that is highly safe, both against opening of the access in unsafe conditions or by unauthorized personnel and against any attempts to dismantle it in the closed access condition, possibly providing evidence of any tampering or disassembly attempts.

Still another object is to provide a safety switch with push-button panel which has high modularity and various configuration possibilities.

Still another object is to provide a safety switch with push-button panel in which the push-button panel has an aesthetically uniform profile with respect to that of the switch and which can be applied to access with means similar to those of the parts of the switch with which it is associated.

Still another object is to provide a safety switch with push-button panel which has a high degree of safety against possible dismantling or tampering attempts.

Not least object is to provide a safety switch with push-button panel which can be connected to one or more communication buses.

These objects, as well as others which will become more apparent hereinafter, are achieved by a safety switch with push-button panel which, according to claim 1, comprises a switching device having a casing adapted to be anchored to a fixed part of the access to be monitored and housing switching means adapted to be operatively connected to one or more control and/or service circuits of the plant for opening/closing them, an actuator device adapted to be anchored to a movable part of the access to interact with said switching means at the opening/closing of the access for opening/closing one or more of the control and/or service circuits of the plant, a push-button panel provided with a plurality of controls to operate on one or more of the control and/or service circuits of the plant.

The push-button panel comprises a shell housing said buttons and means for anchoring to the fixed part of the access, said anchoring means being adapted to allow the shell to rotate around an axis of rotation so as to vary its orientation with respect to said switching device.

Thanks to this combination of features, it will be possible to anchor the push-button panel in a position next to or superimposed on the switching device but being able to autonomously adjust its orientation according to the spaces available and the access opening/closing methods.

The push-button panel will have an aesthetic appearance very similar to that of the switching device, in order to provide a uniform overall appearance and aesthetically homogeneous.

Advantageously, the connection means may comprise at least one connection module which can be mounted on the shell or on suitable anchoring modules to rotate around said axis of rotation.

In this way, the connection module can also be rotated independently of the controls provided, to guarantee greater flexibility in the configuration of the switch.

It will also be possible to apply multiple anchoring modules to increase the number of possible combinations and apply multiple pushbutton panels to the same switch or mount in column multiple pairs of switching devices and pushbuttons.

Suitably, the push-button panel may have at least part of its front face provided with a touch panel having a plurality of virtual commands, a microprocessor also being provided for associating to each of said virtual commands a control and/or signalling function to be associated with one or more of the circuits of the machine or plant.

The term "touch panel" is used to indicate a screen that also functions as an input device as it is sensitive to pressure or to the simple touch exerted by the user.

Thanks to this additional feature, the pushbutton panel can be associated with multiple virtual commands that are different by type, so as to increase its functionality, that is, it will be possible to reproduce visual or light signals for sending information relating to the status of one or more circuits of the plant, increasing safety.

According to a particular configuration, as an example but not limitative, the shell of said push-button panel may be mounted axially aligned with said casing with the interposition of a connection module designed to allow relative rotation around said axis between said casing and said shell.

Furthermore, said connection module may comprise a single connector connected to the connection cables of said controls and of said switching means for their wiring to the plant control unit.

According to an alternative variant, said connection module may comprise a pair of connectors connected respectively to the connection cables of said controls and to the cables of said switching means for their wiring to the system control unit.

Furthermore, said connection module may comprise a connection cable connected to the connection cables of said controls and of said switching means for their wiring to the system control unit.

In any case, the switch thus configured will be particularly convenient and quick to install, as it will be sufficient to connect the connector or connectors, or the cable, with the control unit of the plant to realize the connection of the push-button panel commands with the switching means, without the need for direct wiring inside the device.

Advantageous forms of execution of the invention are obtained in accordance with the dependent claims.

BRIEF DISCLOSURE OF THE DRAWINGS

Further features and advantages of the invention will become more evident in the light of the detailed description of some preferred but not exclusive embodiments of the safety switch according to the invention, illustrated as a non-limiting example with the aid of the accompanying drawing tables, wherein.

Figure 3:
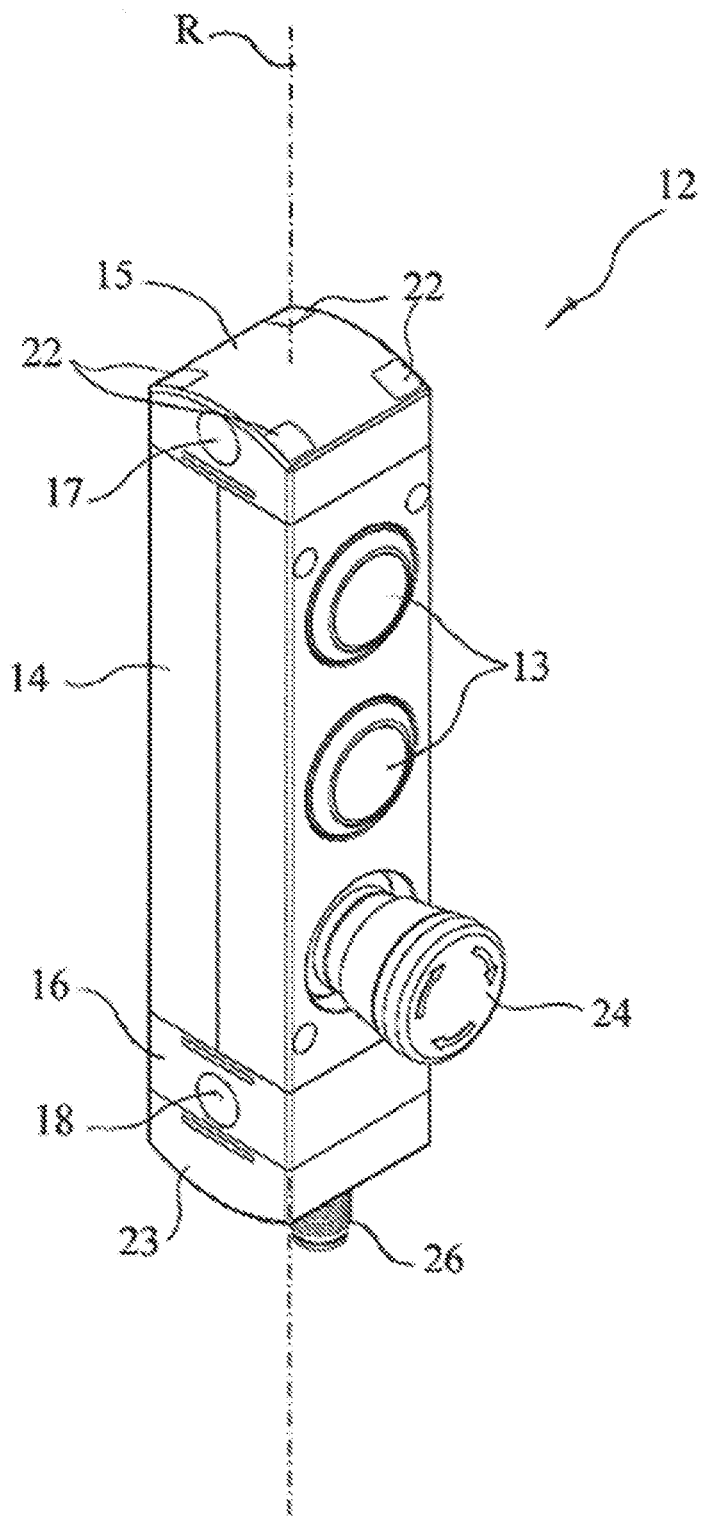
FIG. 3 is a perspective view of the push-button panel of FIG. 1.
Figure 6:
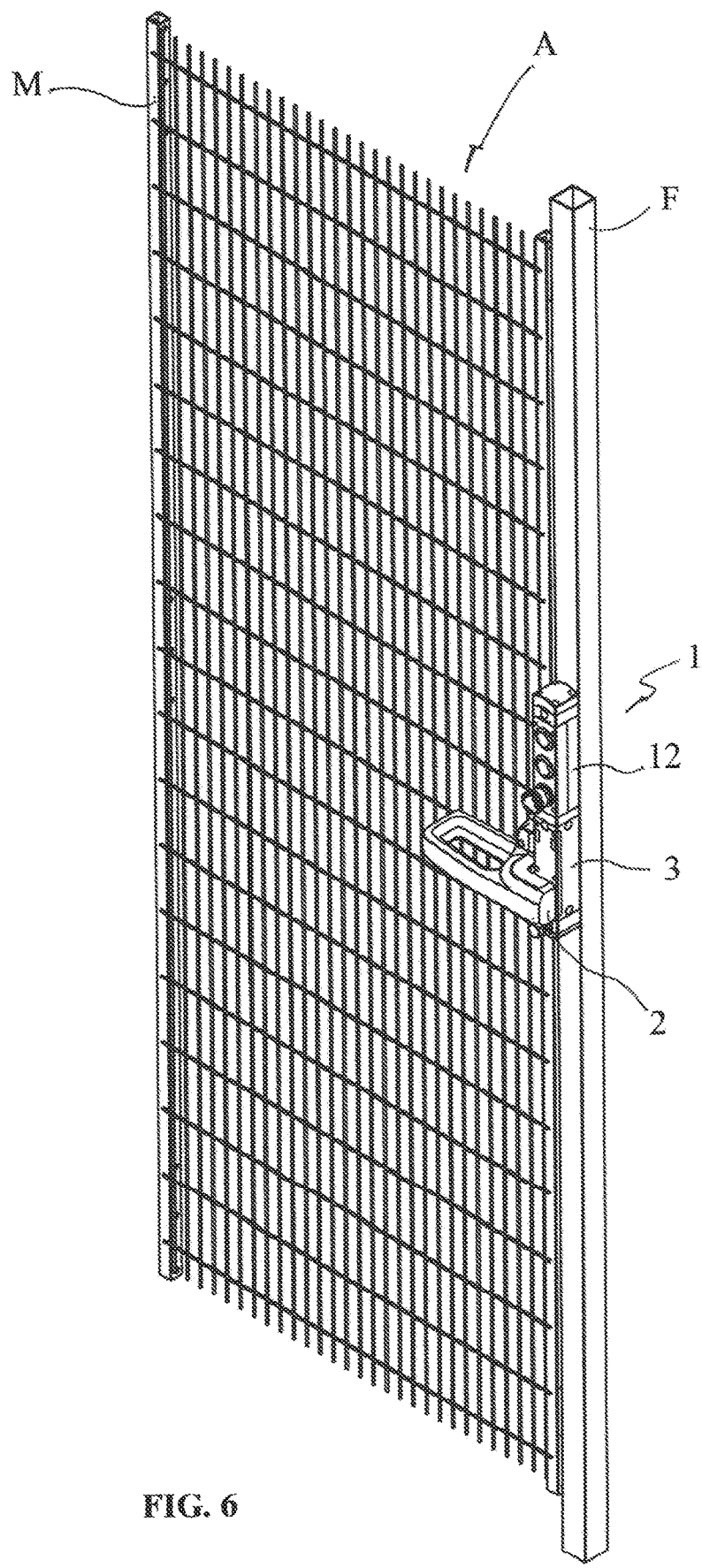
Figure 7:
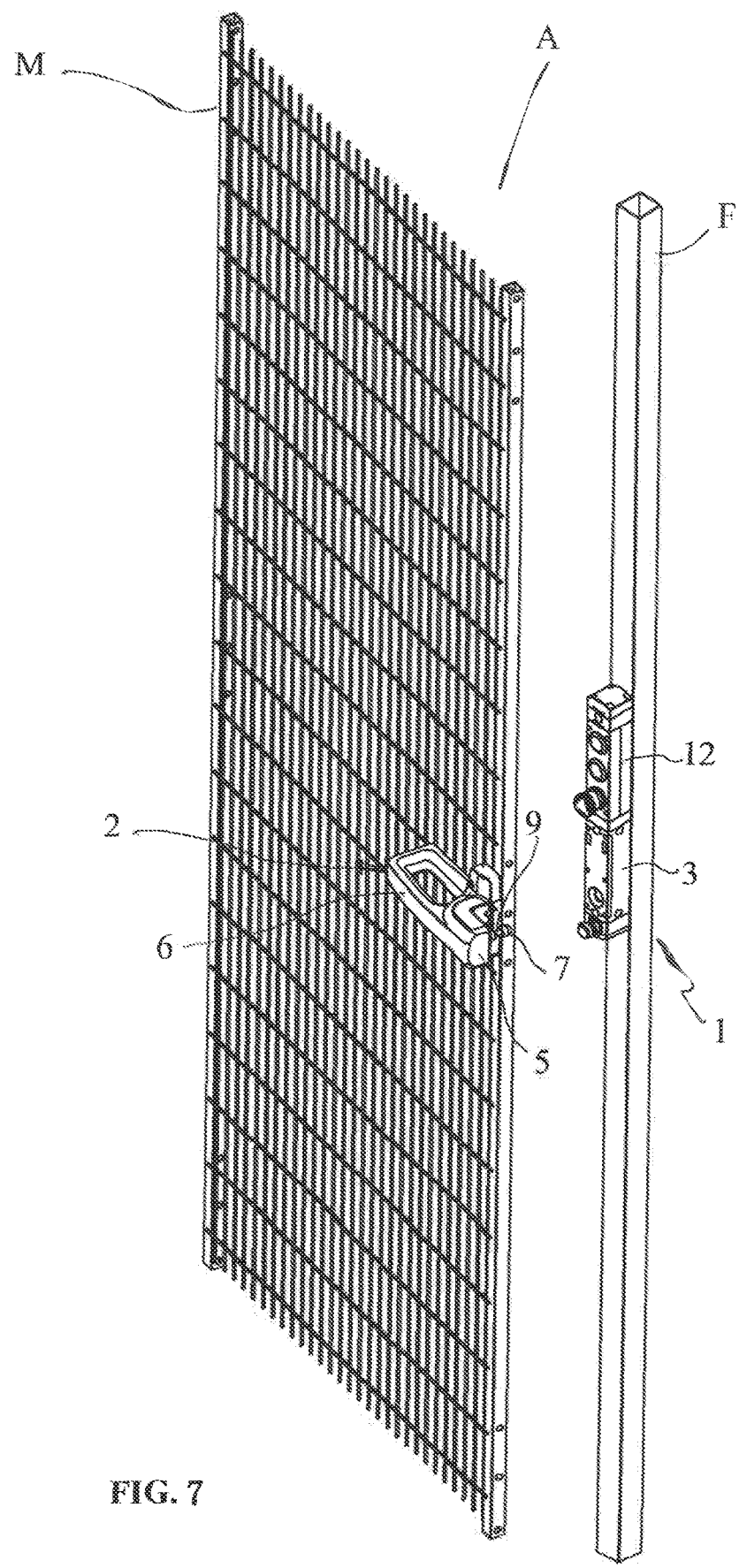
Figure 8:
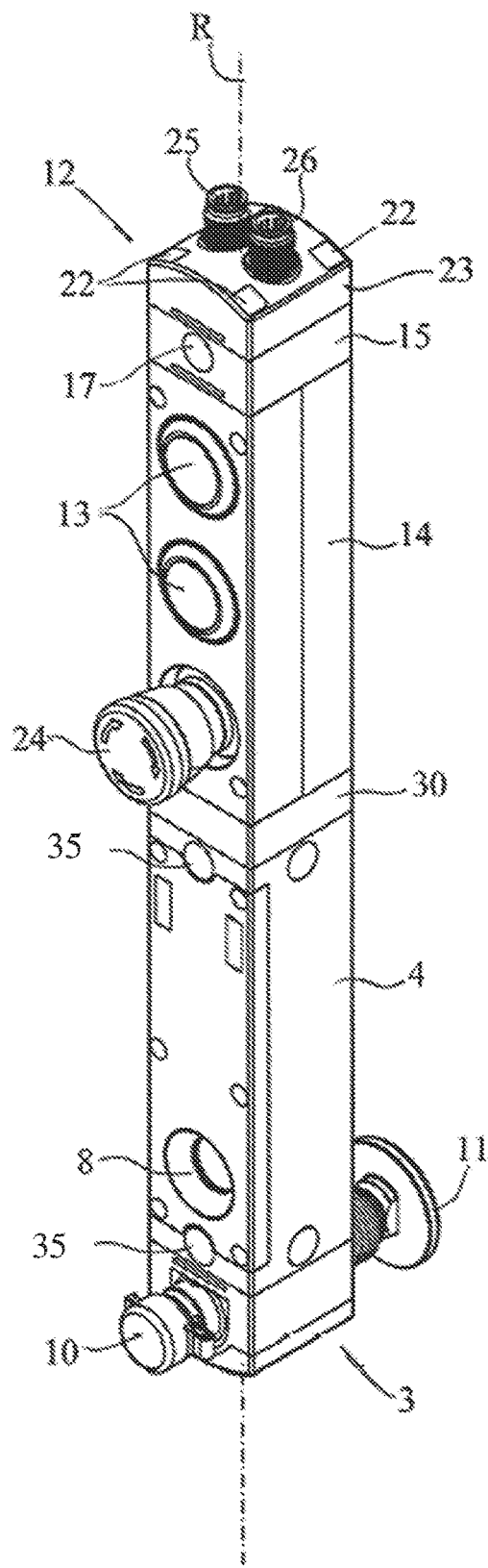
Figure 9:
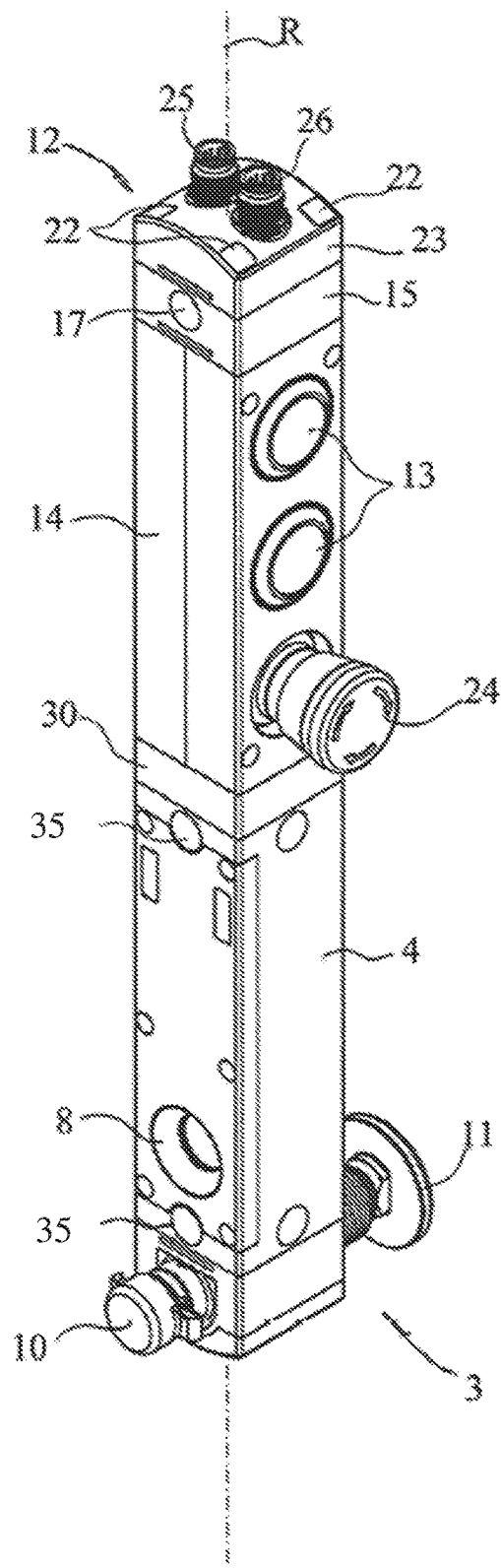
Figure 10:
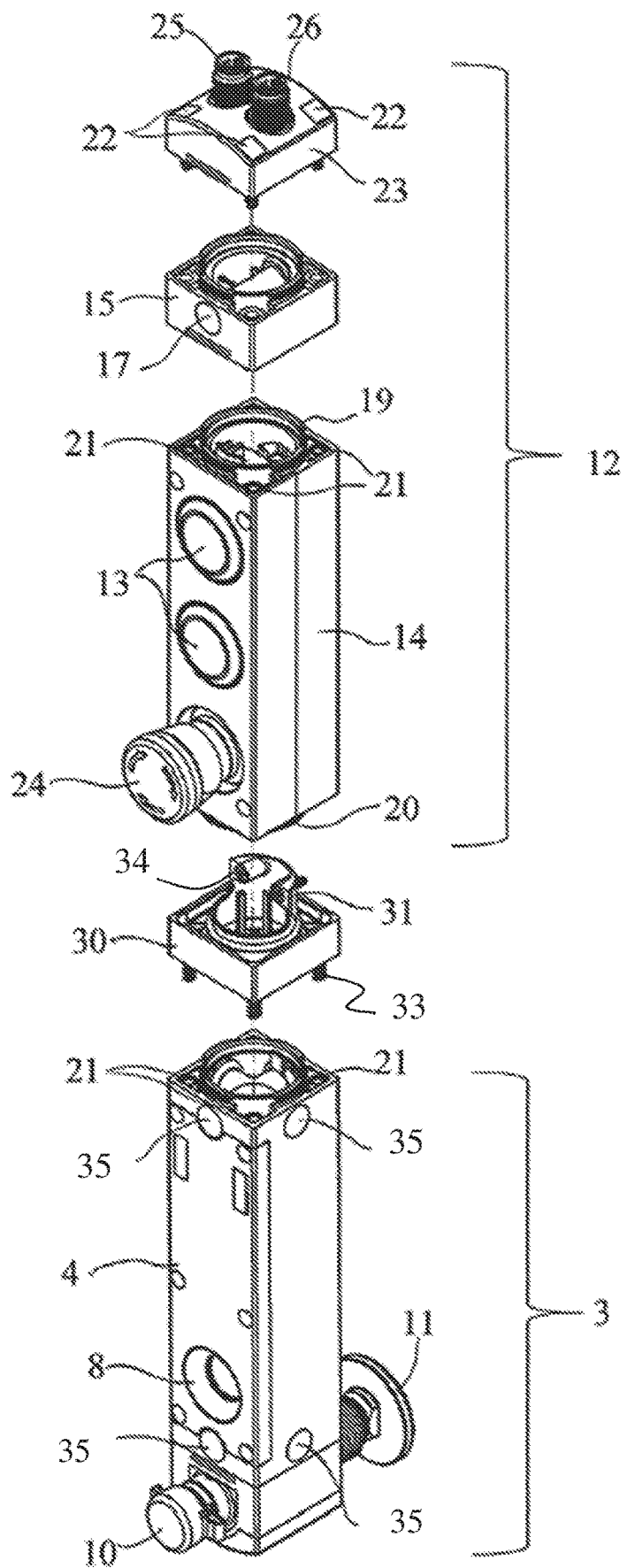
Figure 12:
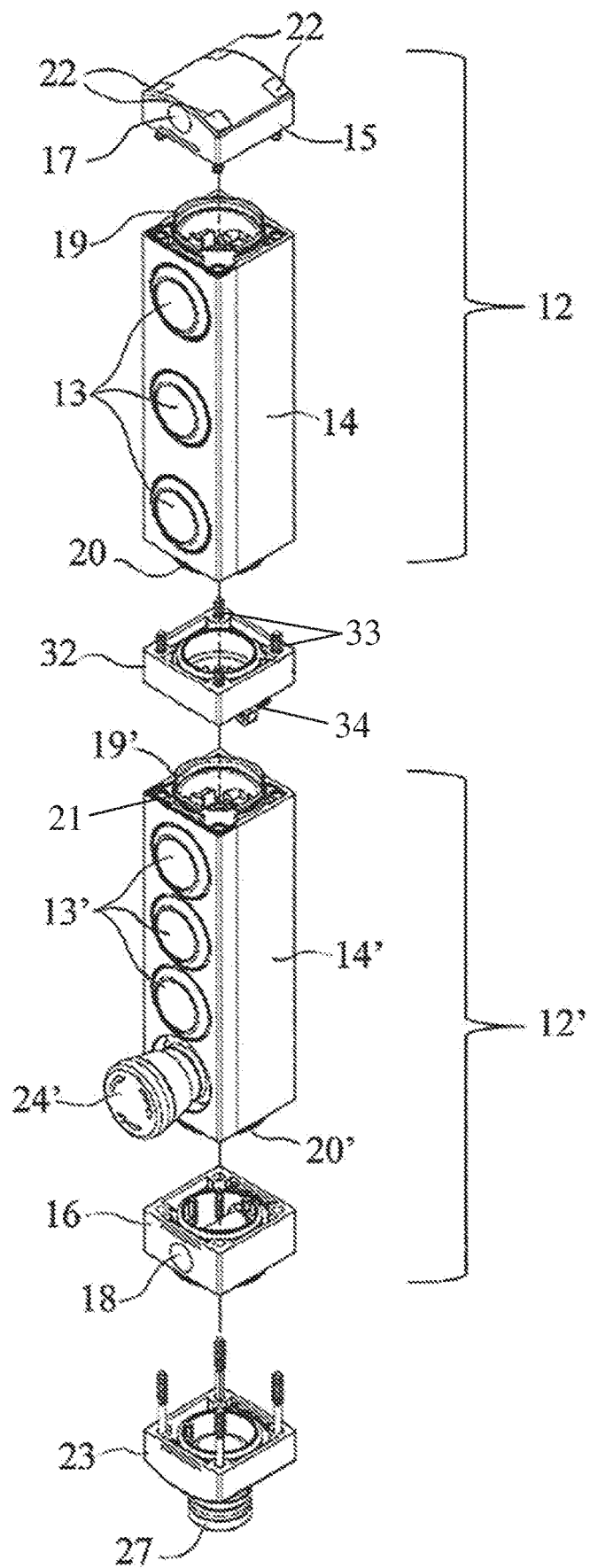

FIG. 5a) is a front view of the pushbutton panel of FIG. 3 according to a first variant;

FIG. 5b) is a front view of the pushbutton panel of FIG. 3 according to a second variant;

FIG. 5c) is a front view of the pushbutton panel of FIG. 3 according to a third variant;

FIG. 6 is a perspective view of a switch in a second preferred configuration and applied to an access and in which the access is closed;

FIG. 7 is a perspective view of the switching device provided with the switch pushbutton panel of FIG. 6 applied to an access and in which the access is open;

FIG. 8 is a perspective view of the switching device of FIG. 6 assembled in a first operating condition;

FIG. 9 is a perspective view of the switching device of FIG. 6 assembled in a second operating configuration;

FIG. 10 is an exploded perspective view of the switching device of FIG. 6;

FIG. 11a) is a front view of the switching device of FIG. 6 according to a first variant;

FIG. 11b) is a front view of the switching device of FIG. 6 according to a second variant;

FIG. 11c) is a front view of the switching device of FIG. 6 according to a third variant;

FIG. 12 is a perspective view of two pushbutton panels mutually connected in an axial direction.

BEST MODES OF CARRYING OUT THE INVENTION

With reference to the attached figures, some preferred but not exclusive configurations of a safety switch according to the invention applicable to the access of a perimeter or safety barrier placed to protect a machine or industrial plant are illustrated.

Generally speaking, access A may be suitably equipped with special electronic and/or electromechanical safety devices designed to interrupt the operation of the machine or plant, or part thereof, when it is opened or a request for opening, for example in the case of machines with high inertia, or even only for its unlocking, or to signal that unlocking or opening has taken place in order to allow an operator to intervene, according to known methods and therefore not described in more detail below.

Figure 1:
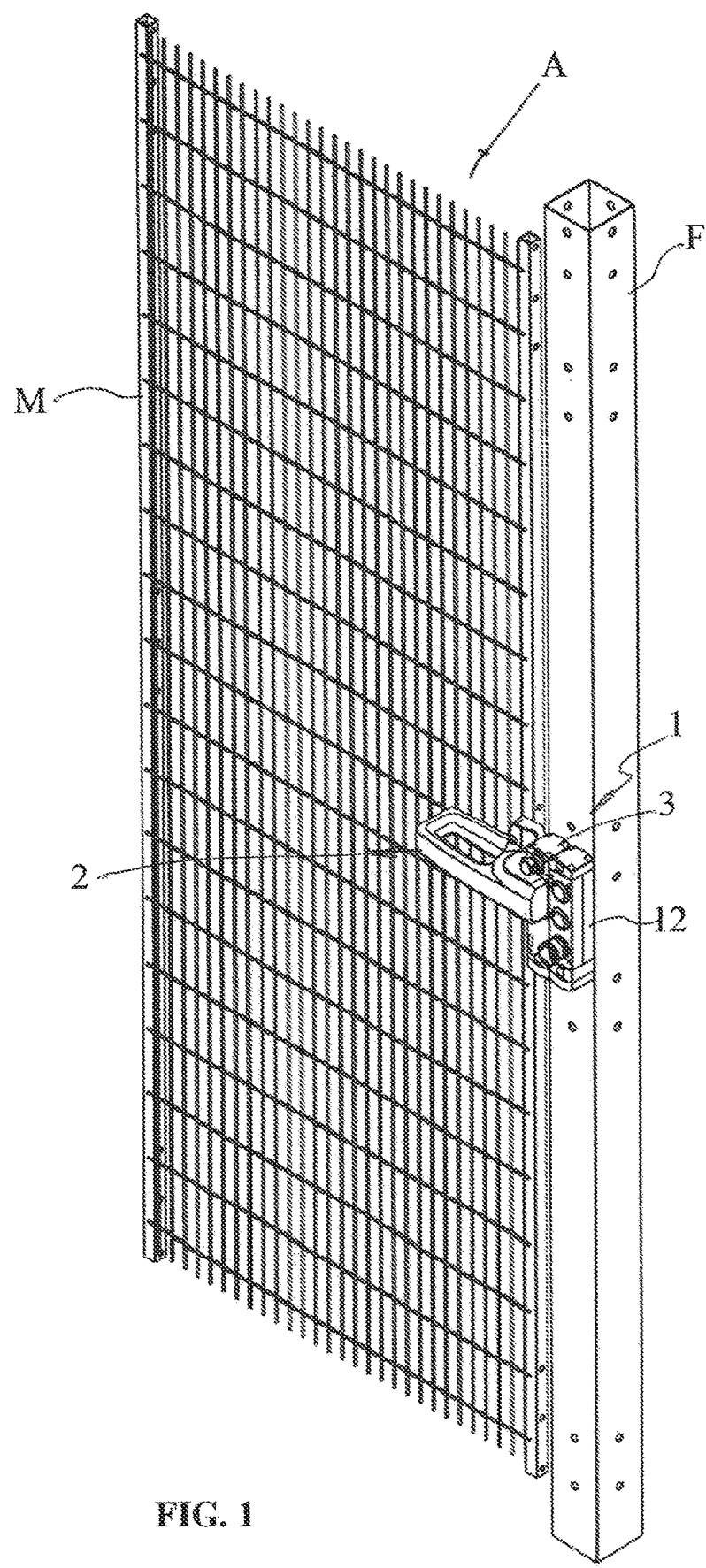
FIG. 1 is a perspective view of a switch according to a first preferred configuration and applied to an access and in which the access is closed.
Figure 2:
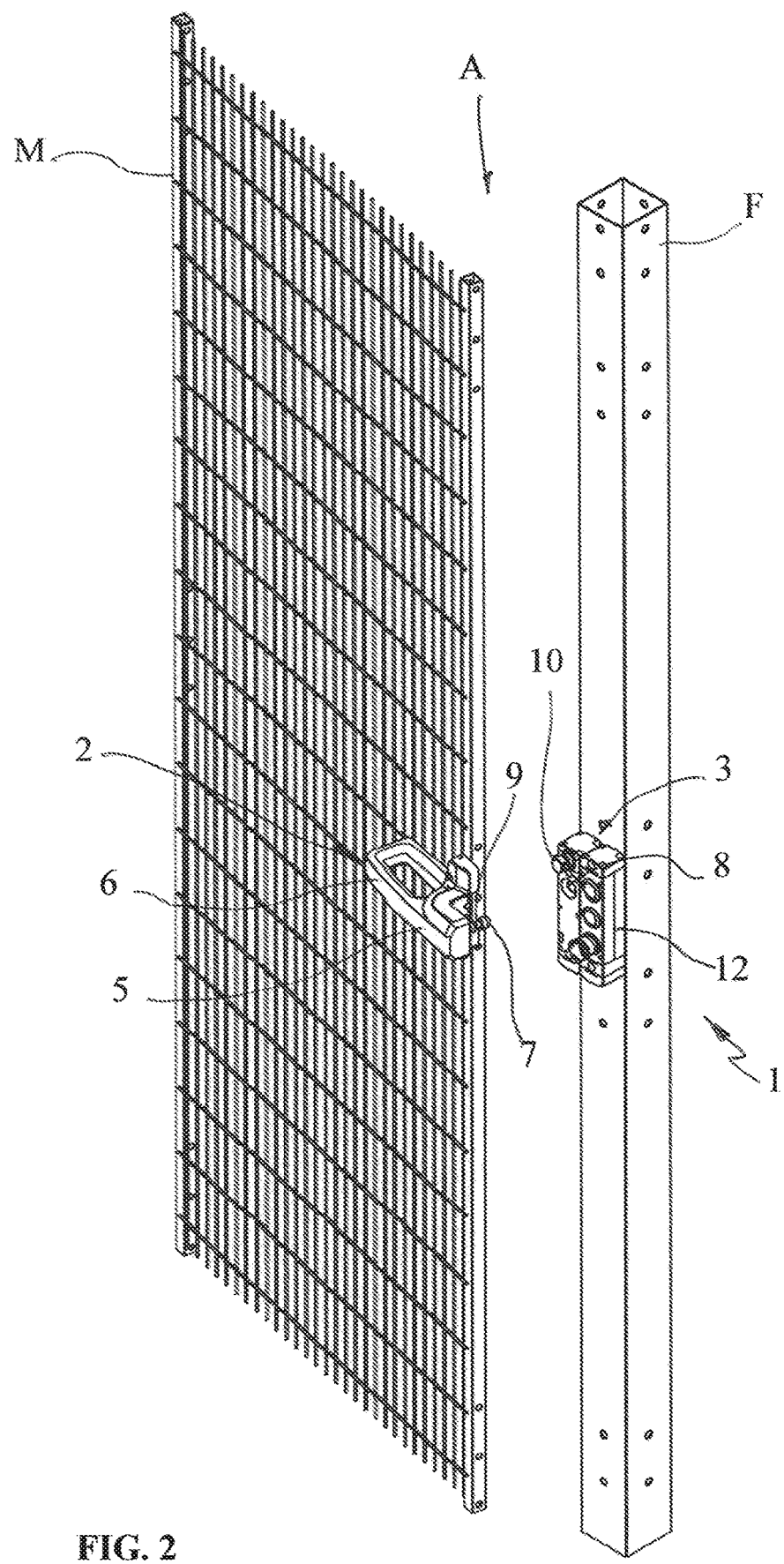
FIG. 2 is a perspective view of the switch of FIG. 1 applied to an access and in which the access is open.

FIGS. 1 and 2 show a first configuration and assembly mode of the safety switch, indicated globally by 1, applied to an access A having left swing opening.

The switch comprises an actuator device 2 configured to be anchored to a movable part M of the access A to be monitored so that at the opening of the access A it interacts, according to known methods, with the power supply circuits of the machine or plant to carry out an instantaneous or timed shutdown, also based on the features of the machine or plant.

On the fixed frame F of the access A there is instead mounted a switching device 3 having a casing 4 which houses inside it switching means, not shown as known per se, adapted to be operatively connected to one or more safety or command and/or service circuits of the plant to control them.

According to an alternative variant, the position of the switching device 3 and of the actuator device 2 with respect to the access A can be reversed, with the first mounted on the moving part M and the second on the fixed part F.

In a known way, the switching means will be connected to a control unit of the machine or plant, not shown as not being part of the present invention, to determine the starting or stopping of the machine or plant or parts thereof following the closing and opening of access A and the consequent interaction with actuator device 2 also in a safe way.

The configuration of the actuator device 2 and its methods of interaction with the switching device 3 are not limitative for the present invention, since they can be selected from those commonly used in the sector.

In the illustrated configurations, by way of example and without limitation, the actuator device 2 is provided with an anchoring body 5 provided with a handle 6 and designed to be fixed on the movable part M of the access A.

A retaining and centering element 7 projects from the anchoring body 5, behind it, to engage, when access A is closed, a frontal centering hole 8 made in the casing 4 of the switching device 2.

In a known manner, the centering hole 8 will be appropriately flared to recover any clearances and misalignments between the two devices when they are mounted on the corresponding parts of access A.

The casing 4 also houses inside locking/unlocking means, not shown, suitable for interacting with the retaining and centering element 7 when this is inserted inside the centering hole 8, to prevent its extraction therefrom and the consequent possibility of opening access A if the predefined safety conditions for the machine or plant have not been fulfilled.

The position of the centering hole 8 can be suitably varied also according to the insertion direction of the holding and centering element 7, without particular limitations.

For example, in the case of access A with sliding closure, the centering hole 8 may be arranged laterally on the casing 4 or it can always be arranged frontally, with the casing 4 which will however be rotated 90° around a vertical axis with respect to the shown embodiment.

The configuration of the locking/unlocking means is not limiting for the present invention, since mechanisms of any type may be used to perform the mechanical retention of the retaining and centering element 7, engaging it mechanically by means of a retainer or retractable tooth or with a magnetic block made through an electromagnet, so as to retain it in the insertion position.

For this purpose, the retaining and centering element 7 will be provided with a groove 9 suitable for being engaged by the above retainer.

Inside the casing 4 there are also electrical and/or electronic control means suitable for being connected with one or more control and/or signalling circuits of the machine or plant in order to send stop, enabling and/or signal commands.

Suitably, the holding mechanism will be controlled by the control means that will allow the disengagement of the holding and centering element 7 only when all the conditions for the safe opening of access A are verified.

Detection means, not visible in the figures, are also provided for detecting the opening of the access A by verifying that the actuator device 2 is no longer in proximity to the switching device 3, so as to send a command to the above control means to stop the machine or system after detecting the opening of the access A.

At the same time, also on the basis of the safety degree to be given to the switch 1, the control means may be connected to the locking/unlocking mechanism for stopping the machine or plant, in an instantaneous or timed way, already later to the release of the holding and centering element 7.

In the configurations of the figures, the detection means comprise a transmitter associated with the actuator device 2, and adapted to send a presence signal, and at least one receiver associated with the switching device 3 and adapted to receive the presence signal when the minimum distance between the two devices 2, 3 is at least equal to a predetermined value sufficient to consider access A closed.

In this condition, the presence signal will be sent to the control means that may authorize the start of the system, if all any further safety conditions have been verified.

By way of example, the transmitter will be a transponder or tag/RFID (Radio Frequency Identification) which will send a unique identification signal to the RFID receiver or antenna.

The tag/RFID may be replaced with other mechanical key or electronic recognition systems such as data transmission via radio, via Hall effect, through magnetic fields, via ultrasound or similar.

Advantageously, the RFID tag will be coded in such a way that it may be univocally recognized by the control means connected to the receiver or antenna and prevent the use of actuator devices other than the one in charge, avoiding the risk of unsafe openings of access A, according to known methods and described for example in WO2013098788.

The methods for connecting the RFID tag to the actuator device 2 are not limiting and are not described in more detail. For example purposes only, the RFID tag may be housed in a special seat, not shown, made inside the anchor body 5.

According to alternative configurations not illustrated, the switch 1 may be electromechanically operated, i.e. the actuator device will be provided with a mechanical actuator, for example of the type commonly defined by key, suitable for insertion at the closure of the access A in a special slot of the casing of the switching device to physically interact with the locking/unlocking mechanism.

Also, the configuration of the switching device 3 is not limiting for the present invention, since it can be selected from those commonly used in the sector.

For example, in the illustrated configurations, by way of non-limiting example, the switching device 3 comprises an auxiliary lock release 10 of the type adapted to be operated by means of a key or another auxiliary release tool, such as a screwdriver, designed to allow manual release of the locking/unlocking mechanism, and also of a physical release button, preferably a mushroom 11 mechanically connected to the locking/unlocking mechanism for the emergency stop of the machine.

The switching device 3 may also be arranged remotely, i.e. positioned in a different place from the one shown and adapted to activate the release by means of, for example, an electrical or mechanical control, such as for example a bowden cable, a hydraulic or pneumatic circuit or means similar.

The switching device 3 also comprises further control means connected to the control means and adapted to send to the latter one or more activation/deactivation and/or signalling commands for the consequent response by the circuits of the machine or system, also through one or more communication buses.

In particular, the control means comprise a push-button panel 12 provided with a plurality of controls 13 suitable to be connected to the switching means, directly or indirectly through the control unit of the plant, to allow an operator to intervene on one or more of the control and/or service circuits of the plant.

In particular, the controls 13 will each be provided with respective contact units, not shown as they are internal to the push-button panel 12, suitable for interacting with the switching means to perform their electrical switching and send consequent outputs to the control and/or service circuit of the machine or plant.

In its more general configuration, the push-button panel 12 comprises a shell 14 to which the controls 13 are fixed, and which houses the above contact units, and one or more modules for anchoring to the fixed part F of access A.

The anchor modules 15, 16, two in the configuration of FIG. 3, are mounted rotatably on the shell 14 to allow the latter to rotate around an axis of rotation R, substantially vertical in use, so as to vary its orientation with respect to the switching device 3.

According to a particular variant, the push-button panel 12 may be devoid of the modules for the rotational anchoring and instead be provided with different rotational anchoring means which in the simplest configuration may also be simple holes arranged on the various faces of the shell 14 to allow their fixing according to at least two orientations differentiated and rotated through each other by 90°.

For example, the anchoring means may be defined by one or more pairs of mutually crossed through holes which extend from opposite faces of the shell so that the fixing members, such as screws or the like, selectively engage only one of the holes of each pair, depending on the selected orientation.

In a particular configuration, exemplificative but not limitative, the push-button panel 12 may have the same axial dimension as the switching device 3.

In the configuration of FIGS. 1 and 2 it is observed that the shell 14 is oriented so as to arrange the controls 13 on the same side with respect to the front face of the casing 4 of the switching device 3.

In FIG. 3 the same push-button panel 12 is shown, however, having the shell 14 rotated by 90° with respect to the previous configuration.

Figure 4:
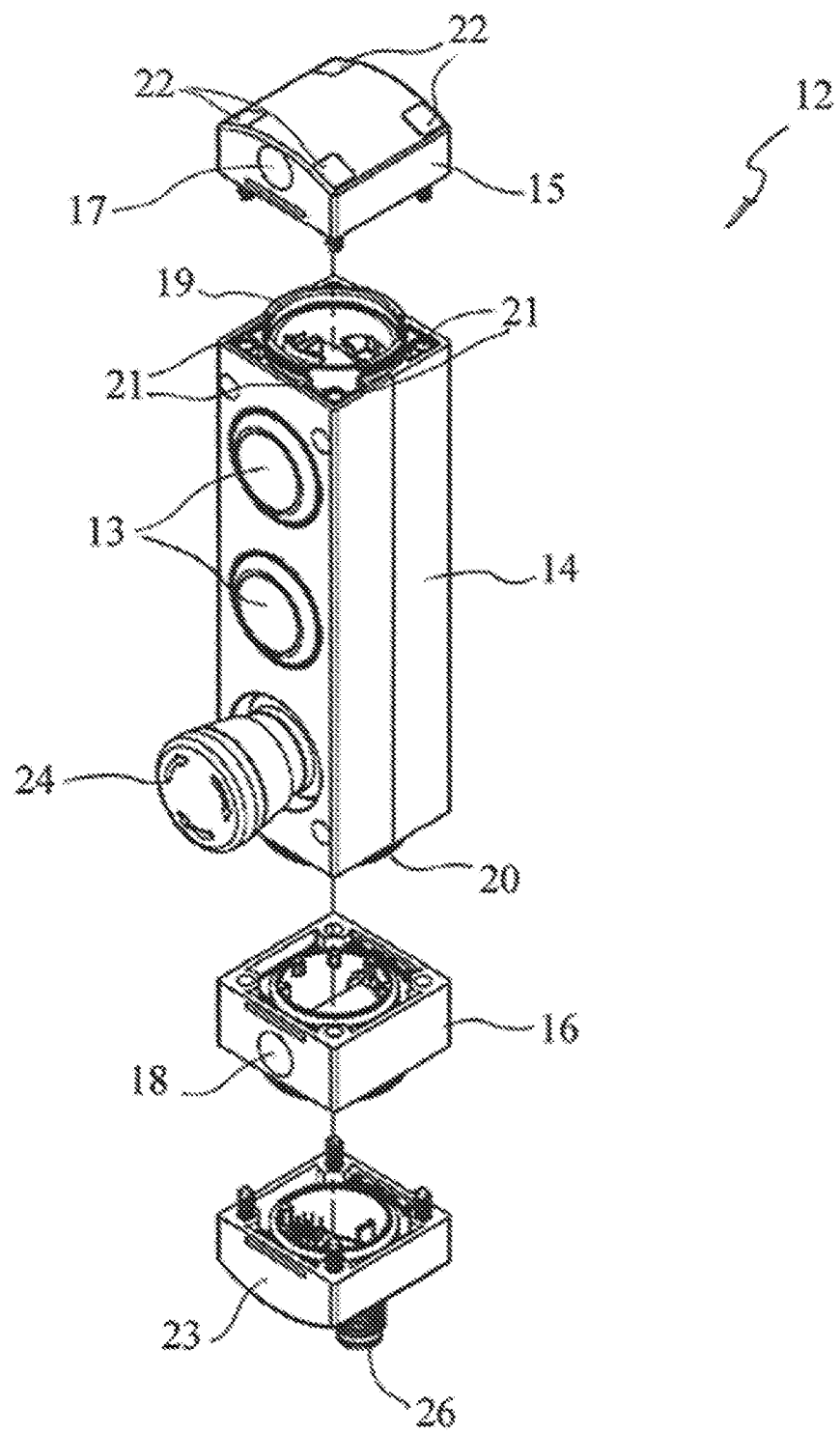
FIG. 4 is an exploded perspective view of the pushbutton panel of FIG. 3.

As can be seen more clearly from FIG. 4, the push-button panel 12 comprises an upper anchoring module 15 and a lower anchoring module 16 fixed on opposite transverse faces of the shell 14 and each provided with a hole 17, 18 for inserting a fixing screw or similar member.

The upper and lower terms are used only for the purpose of simplification and with reference to the attached figures, but it is understood that the two modules 15, 16 may also be mounted upside down.

The lower and upper faces of the shell 14 comprise respective male/female type coupling elements suitable for coupling with corresponding female/male type elements of the respective anchoring modules 15, 16.

In the particular illustrated configurations, the male-type coupling elements are defined by cylindrical axial appendixes 19, 20 suitable for engaging corresponding female elements defined by circular grooves provided in the respective anchoring modules 15, 16 in order to allow rotation of the shell 14 with respect thereto.

After adjusting the rotation, the locking of the shell 14 with respect to the anchoring modules 15, 16 may be obtained by means of axial screws, or similar fixing members, inserted in respective axial passages 21 which extend into the shell 14 and in the anchoring 16 and connection modules 23, through through-holes provided in the anchoring modules 15, 16 and connection module 23 which may be closed by anti-burglary caps 22 or other sealing means suitable to cover them and prevent access, also providing evidence of a possible their removal by unauthorized personnel.

The anti-burglary caps 22 will be adapted to be snugly fitted in the corresponding through-holes so as not to present any element that may facilitate their extraction and will be configured to break if they are removed, so as to prevent their re-insertion and give immediate evidence of the attempt to remove.

In this way it will not be possible to remove the anchoring module 15 or to dismantle the push-button panel 12 without leaving a trace of a similar action.

The front holes 17, 18 may also be closed again with anti-burglary caps or similar sealing means designed to prevent access to the relative screws or similar fixing elements.

Similar fixing members and relative sealing means may also be associated with the switching device 3.

In this way, switch 1 will always be adequately protected against any actions aimed at its removal or dismantling, even partial, and which could lead to access A in an unsafe condition.

The push-button panel 12 is also provided with a module 23 for connecting the controls 13 to the switching means.

The connection module 23 is mounted on one of the two anchor modules 15, 16, in particular on the anchor module 16 according to the illustrated configuration, to rotate around the rotation axis R, so that it may be oriented according to specific operating needs.

Figure 5:
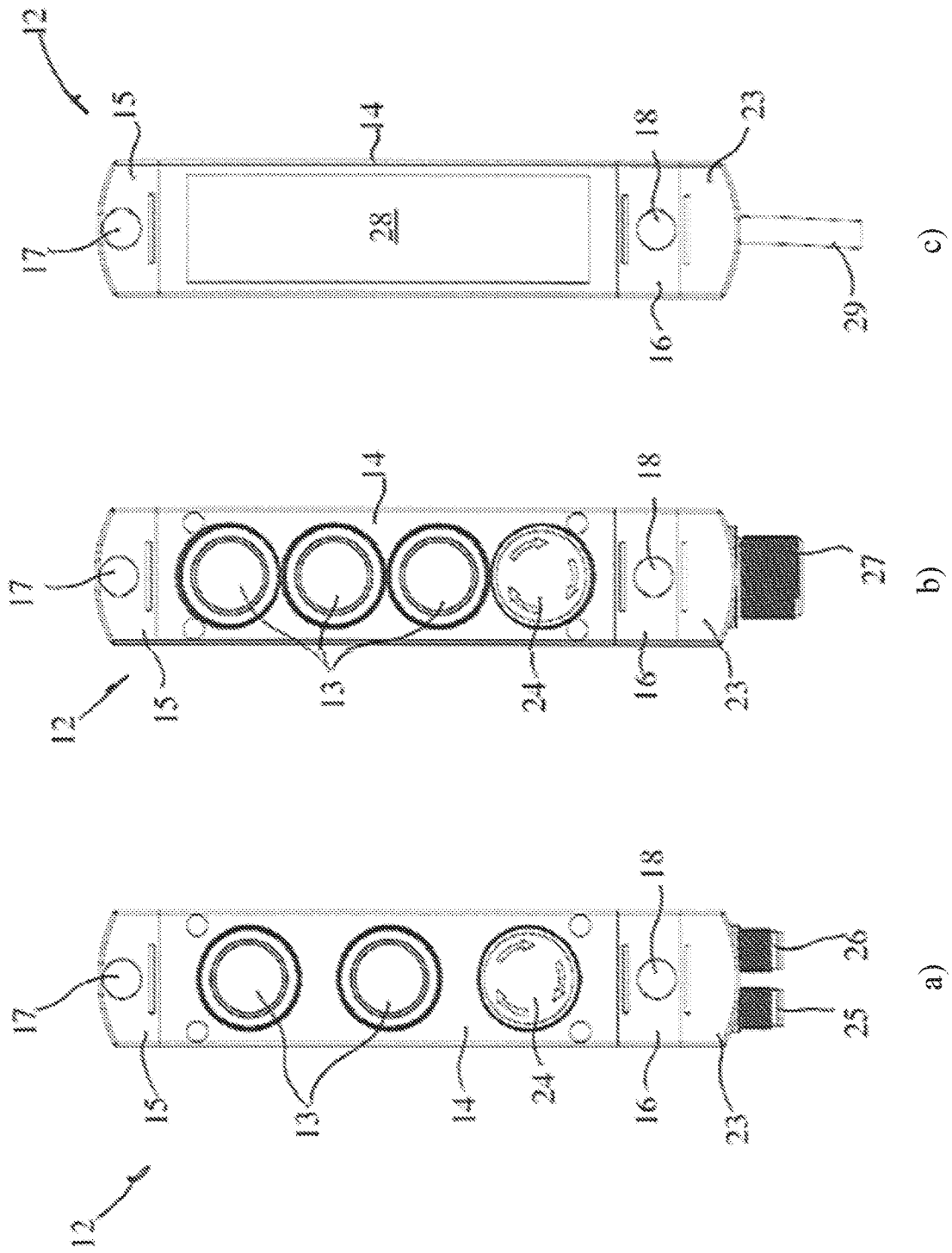

FIG. 5 shows three variants of the pushbutton panel 12 described above, which differ in the type of controls 13 and in the configuration of the connection module 23.

However, it is understood that the push-button panel 12 may also have different configurations for the type and/or number of controls 13 and/or for the type of connection module 23, without particular theoretical limitations.

In fact, push-button panels 12 suitable for being applied to one or two switching devices or other push-button panels and having a shell 14 of reduced or increased height may be provided.

In the first variant from the left, the pushbutton panel 12 comprises two pushbuttons 13 and an emergency control 24 which can be unlocked by means of rotation.

The connection module 23 includes two multipolar connectors 25, 26 which will be connected to respective series of connection cables, not shown, of the controls 13, 24 for their wiring to the plant control unit.

In the central variant, the pushbutton panel 12 is equipped with three pushbuttons 13, as well as the above emergency control 24.

The connection module 23 comprises a single multipolar connector 27 to which all the connection cables of the buttons 13 will be connected for their wiring to the plant control unit.

In both configurations, one or more of the buttons 13 and the control 24 may be replaced with LED lights for sending light signals relating to the status of the respective circuits of the system, or the same buttons 13 may be equipped with LED lights designed to light up after pressing the button.

According to further variants, further devices may be applied to the cover of the push-button panel 12, such as indicator lights, selectors, potentiometers, emergency buttons, buzzers, badge readers for access control, fingerprint readers, iris readers, biometric readers or cameras for facial recognition and the like and/or a different number of buttons.

In the third right variant, the pushbutton panel 12 has the front face provided with a touch panel 28 designed to reproduce a plurality of virtual commands, which will then be graphically reproduced on its monitor and whose functions will be appropriately managed by a microprocessor connected to the touch panel 28 to associate to each of the virtual commands a specific control and/or signalling function, for its association via the system control unit to one of the circuits of the machine or system.

In summary, each specific area of the touch panel 28 will be assigned in a programmable way to a specific function reproducing the function of a traditional command, such as an ON/OFF button, a selector, a stop button, a two-hand safety command, a button for sending a visual and/or sound signal, and/or for reproducing audio and/or video output signals.

Touching a specific virtual command will cause the microprocessor to send a specific signal to the control means which will act on one or more circuits of the machine or plant in a manner completely analogous to what happens for devices with real commands, so as to perform the action associated with the virtual command.

The actions referred to the virtual commands may be either actions with a safety function or actions that do not have a safety function.

In a first variant, the connection module 23 instead comprises a connection cable 29 connected to the connection cables of the controls 13, 24 for their wiring to the plant control unit.

The output or outputs for the cables provided on the various modules may be either axial or lateral, without particular theoretical limitations.

For example, one or more cable exits may be defined by so-called breakout exits arranged on the rear faces of the various modules.

According to a not shown variant, the push-button panel 12 may be devoid of the connection module 23 and in this case the shell 14 may be provided with one or more breakout holes located on its rear wall or on one of the side walls for lateral or rear exit of cables.

FIGS. 6 and 7 show a second way of connecting the push-button panel 12 to the switching device 3, wherein the shell 14 of the push-button panel 12 is mounted in axis with the casing 4 with the interposition of an intermediate connection module 30 designed to allow rotation relative between the casing 4 and the shell 14 around the same rotation axis R.

FIGS. 8 and 9 show the push-button panel 12 connected in axis to the switching device 3 with two different angular orientations, wherein the shell 14 is rotated by 90°. As can be seen more clearly from FIG. 10, the rotatable connection between the casing 4 and the shell 14 is obtained by means of a first connection module 30 which may be anchored removably and rotatably on one side to the casing 4 and on the opposite side to the shell 14.

The first connection module 30 comprises on one side a male-type coupling element defined by an at least partially cylindrical guide element 31 which develops axially to rotatably engage the lower cylindrical appendix 20 of the shell 14.

On the opposite side, the first connection module 30 is instead provided with a female-type coupling element, not visible from the figures, suitably shaped to accommodate the axial protrusion of the casing 4.

The first connection module 30 may also be provided with means for limiting the rotation of the shell 14 and which may prevent the shell 14 from undergoing a rotation greater than 360°, even more preferably greater than 270°, which could lead to a excessive twist of the connection cables and their consequent damage.

In a similar way, the additional modules 15, 16 may also be provided with means for limiting rotation, so as to avoid kinking of the internal connection wires.

In this variant, the push-button panel 12 will be provided with a single anchoring module 15 and the fixing of the whole assembly formed by a switching device 3 and a push-button panel 12 will be guaranteed by the anchoring module 15 and by the fixing means of the casing 4, which could be for example through-holes 35 made in the same casing 4 for the insertion of respective fixing members, not shown as known per se.

The front holes 35 may also be closed again by means of anti-burglary caps or similar sealing means designed to prevent access to the relative screws or similar fixing elements.

In the illustrated configuration, the connection module 23 is connected to the single anchoring module 15 and is provided with both the connectors for connecting the buttons 13 and the control 24 of the push-button panel 12 and those of the switching and control means of the switching device 2.

The connection module 23 may also be rotated with respect to the anchoring module 15, so that all the parts of the assembly may rotate independently of each other to assume the most suitable position for the type of mounting on the fixed frame F and the preferred intervention for the user.

Also for the connection module 23, means for limiting the rotation may be provided to avoid the kinking of the internal connection wires.

Once the ideal configuration has been defined, the rotation lock will be obtained in a similar way to that described above, i.e. by means of axial screws, or similar elements, which may be inserted through through-holes on the upper connection module 23 to be inserted in corresponding axial passages 21 of the shell 14 and the casing 4, as well as all of the other intermediate modules.

Also in this case the through-holes of the connection module 23 may be provided with anti-burglary caps 22 or other sealing means.

Figure 11:
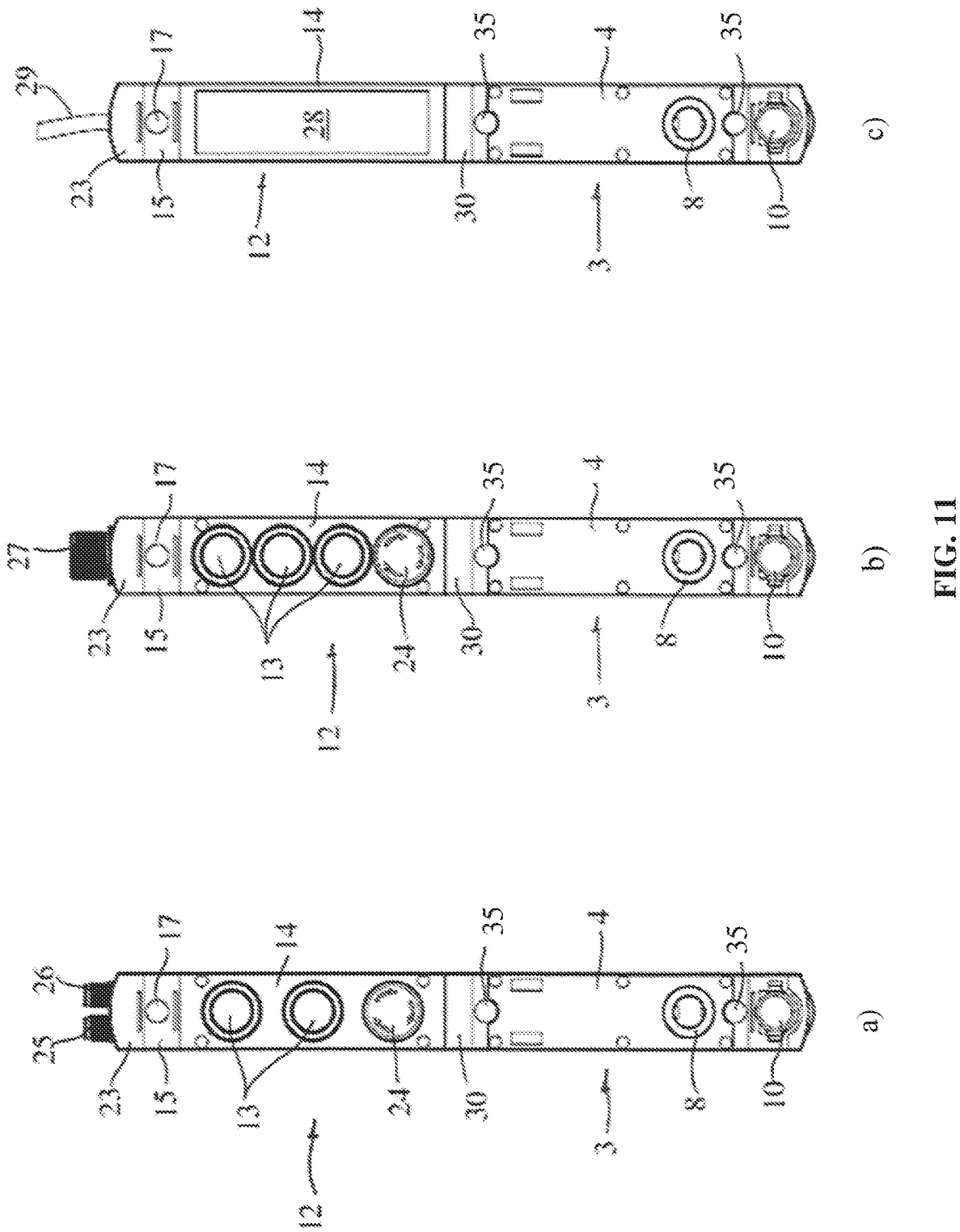

FIG. 11 shows three variants of the assembly consisting of the switching device 3 and the pushbutton panel 12 described above, which differ in the type of controls 13 and in the configuration of the connection module 23.

Also in this case, it is understood that the push-button panel 12 may also have different configurations in the type and/or number of commands and/or in the configuration of the connection module 23, without particular theoretical limitations.

In the first variant from the left, the pushbutton panel 12 comprises two buttons 13 and an emergency control 24 which can be unlocked by means of rotation.

The connection module 23 comprises two multipolar connectors 25, 26, for example each with 12 pins, which will be connected respectively to the connection cables of the controls 13, 24 and to the cables of the switching means for their wiring to the control unit of the plant.

In the central variant, the pushbutton panel 12 is equipped with three buttons 13, as well as the aforementioned emergency command 24.

The connection module 23 comprises a single multipolar connector 27, for example 19-pin, to which all the connection cables of the controls 13, 24 and of the switching means will be connected for their wiring to the plant control unit.

In both configurations, one or more of the buttons 13 may be replaced with LED lights for sending light signals relating to the status of the respective circuits of the system, or the buttons 13 themselves may be equipped with LED lights suitable for switching on later when the button is pressed.

Instead of LEDs, indicator lights, selectors, potentiometers, emergency buttons, buzzers and the like may be provided.

In the third right variant, the pushbutton panel 12 has the front face provided with the touch panel 28 described above.

The connection module 23 comprises a connection cable 29 connected to the connection cables of the controls 13, 24 and of the switching means for their wiring to the plant control unit.

According to alternative variants, the connection module 23 may have different types of connectors, for example a double cable, which may exit axially or laterally, for example if you want to pass them through the frame.

In the latter case, the possibility of rotation of the connection modules will be particularly advantageous since the connector may be positioned according to specific needs.

According to a further configuration not illustrated, the push-button panel may house a first control card inside which can be connected to the system control unit directly or through a second control card housed in the switching device housing.

Furthermore, a first terminal block with output terminals pre-wired on the first control board may be housed in the shell.

Furthermore, the shell may comprise a removable cover provided with the controls and having a second terminal block adapted to be connected to the input terminals of the first terminal block for the connection of the controls.

This configuration will have the advantage of allowing the end user to connect the controls according to his needs, customizing the operation of the switch but without being able to intervene on the safety functions.

According to further variants, applicable indifferently to the various versions described above, the pushbutton panel 12 and/or the device 3 will comprise one or more communication buses, which may or may not be safety, which will allow all signals to be transmitted on a limited number of cables and avoid wiring a relatively large number of cables.

Finally, FIG. 12 shows a further configuration in which two push-button panels 12, 12' are connected in axis with each other by interposing a second connection module 32 suitable for allowing the rotational connection between the shells 14, 14'.

The configuration of the second connection module 32 will be such as to allow to connect any two push-button panels, different both in the axial size and in the number and/or type of push-buttons.

Furthermore, by setting up more than a second connection module 32, it will also be possible to connect more than two push-button panels in series.

Furthermore, the push-button panels connected in series may be associated with one or more switching devices, simultaneously, i.e. by connecting all the push-button panels to the same switching devices, or differentiated, with some push-button panels connected to one or more switching devices and other push-button panels connected to other switching devices.

According to a preferred but not limiting configuration, the first and the second connection module 30, 32 may be structurally identical or similar and therefore interchangeable with each other.

According to the illustrated configuration, these modules 30, 32 are provided with one or more axial coupling elements 33, four axial pins or screws in the illustrated configurations, designed to be inserted in corresponding axial passages 21 made in the casing 4 of the switching device 3 or in one of the shells 14, 14' of the push-button panels 12, 12', depending on whether the push-button panel 12 must be connected with the switching device 3 or with the other push-button panel 12'.

In turn, the engagement and guide element 31 will be provided with two further transverse engagement elements 34, two screws or pins in the illustrated configurations, which will be fixed inside the one between the shells 14, 14' which will not be connected by the axial coupling elements 33.

For the fixing of the transverse coupling elements 34 it will generally be necessary to proceed with the preventive removal of the front closing cover of the casing 4 or one of the two shells 14, 14'.

The switch according to the invention is susceptible of numerous modifications and variations, all of which are within the inventive concept expressed in the attached claims. All the details may be replaced by other technically equivalent elements, and the materials may be different according to requirements, without departing from the scope of protection of the present invention.

The invention claimed is:

1. A safety switch with push-button panel for monitoring an access (A) to machines or industrial plants, comprising:
    a switching device (3) having a casing (4) adapted to be anchored to a fixed part (F) of the access (A) to be monitored and housing switching means adapted to be operatively connected to one or more control and/or service circuits of the machines or plants for opening/closing the one or more control and/or service circuits;
    an actuator device (2) adapted to be anchored to a movable part (M) of the access (A) to interact with said switching means at an opening/closing of the access (A) for opening/closing one or more of the control and/or service circuits of the machines or plants;
    a push-button panel (12) fitted with one or more controls (13) designed to operate one or more of the control and/or service circuits of the machines or plants;
    wherein said push-button panel (12) is provided with means for the electrical connection of said one or more controls (13) to said switching means, said one or more controls (13) being provided with respective contact units suitable for interacting with said switching means to send consequent outputs to the one or more control and/or service circuits of the machines or plants;
    wherein said push-button panel (12) comprises a shell (14) provided with said one or more controls (13) and means for anchoring to the fixed part (F) of the access (A), said anchoring means being adapted to allow rotation of said shell (14) around a rotation axis (R), so as to vary an orientation of said shell with respect to said switching device and/or to the one or more control and/or service circuits.

2. The safety switch as claimed in claim 1, wherein said anchoring means comprise one or more modules (15, 16) for anchoring and rotating said shell (14) to the fixed part (F) of the access (A), said one or more modules (15, 16) being rotatably mounted on said shell (14) to allow said shell to rotate about said axis of rotation (R).

3. The safety switch as claimed in claim 2, wherein said electrical connection means comprise at least one connection module (23) for the electrical connection of said one or more controls (13) to said switching means.

4. The safety switch as claimed in claim 3, wherein said at least one connection module (23) is rotatably mounted on one of said one or more modules (15, 16) to rotate about said axis of rotation (R).

5. The safety switch as claimed in claim 4, wherein said at least one connection module (23) comprises one or more connectors (25, 26, 27, 29) and a series of cables connected to respective connectors of said one or more connectors (25, 26, 27, 29) for connecting said one or more controls (13) and/or said switching means to a plant control unit.

6. The safety switch as claimed in claim 5, wherein said at least one connection module (23) comprises a single multipolar connector (27) connected to said said one or more controls (13) and to said switching means for wiring said one or more controls (13) to the plant control unit.

7. The safety switch as claimed in claim 5, wherein said at least one connection module (23) comprises a pair of multipolar connectors (25, 26) connected respectively to said one or more controls (13) and to the cables for wiring said one or more controls (13) to the plant control unit.

8. The safety switch as claimed in claim 5, wherein said at least one connection module (23) comprises one or more connection cables (29) connected to said one or more controls (13) and to said switching means for wiring said one or more controls (13) to the plant control unit.

9. The safety switch as claimed in claim 1, wherein said push-button panel (12) has a front face, at least part of the front face provided with a touch panel (28) on which one or more virtual controls can be reproduced, a microprocessor being further provided which is adapted to associate each of said one or more virtual controls with a control and/or signalling function to be associated with the one or more control and/or service circuits of the machines or plants.

10. The safety switch as claimed in claim 1, wherein said push-button panel (12) comprises one or more LED lights for sending light signals relating to the opening/closing of respective control and/or service circuits of the machines or plants.

11. The safety switch as claimed in claim 1, wherein said shell (14) is axially aligned with said casing (4), a first intermediate connection module (30) being interposed between said shell (14) and said casing (4) and designed to allow the rotation about said axis of rotation (R) of said casing (4) and with respect to said shell (14) when said casing (4) and said shell (14) are not anchored to the fixed part (F) of the access (A).

12. The safety switch as claimed in claim 11, wherein said first intermediate connection module (30) is adapted to be removably anchored on one side to said casing (4) and from the opposite side to said shell (14) and comprises a guide element (31) at least partially cylindrical which extends axially to engage said shell (14).

13. The safety switch as claimed in claim 1, wherein two different push-button panels (12, 12') are provided and are connected with respective axially aligned shells (14, 14'), second connection modules (32) being further provided, each one being adapted to connect axially aligned shells (14, 14') of two different push-button panels (12, 12'), each of said one or more second connection modules (32) comprising respective coupling elements (33, 34) adapted to couple to said axially aligned shells (14', 14).

14. The safety switch as claimed in claim 1, wherein said push-button panel (12) and/or said switching device (3) comprise one or more communication buses for transmitting of data to the machines or plants.

15. The safety switch as claimed in claim 1, further comprising locking/unlocking means having a device for identifying operators authorized to intervene on said one or more controls and comprising an RFID tag connected to said one or more controls for receiving an identification code to be sent to said one or more controls for comparison of the identification code with a verification code.

* * * * *